United States Patent
Kouya

(10) Patent No.: US 6,552,763 B1
(45) Date of Patent: Apr. 22, 2003

(54) LIQUID CRYSTAL DISPLAY PANEL AVOIDING DISPLAY UNEVENNESS AND MANUFACTURING METHOD

(75) Inventor: Akiyoshi Kouya, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/667,705

(22) Filed: Sep. 22, 2000

(30) Foreign Application Priority Data

Sep. 29, 1999 (JP) .......................................... 11-277602

(51) Int. Cl.⁷ ..................... G02F 1/1335; G02F 1/1333
(52) U.S. Cl. .......................................... 349/96; 349/158
(58) Field of Search .......................... 349/96, 187, 158; 359/485, 487, 494

(56) References Cited

U.S. PATENT DOCUMENTS 4,398,804 A * 8/1983 Yokoi ........................... 349/96
5,864,427 A * 1/1999 Fukano et al. ............... 359/492

FOREIGN PATENT DOCUMENTS

| JP | 59-226324 | 12/1984 |
| JP | 06-167611 | 6/1994 |
| JP | 9-281474 | * 10/1997 |
| JP | 11-174435 | * 7/1999 |
| JP | 11-249124 | * 9/1999 |
| WO | WO 97/21123 | 6/1997 |

* cited by examiner

Primary Examiner—Toan Ton
(74) Attorney, Agent, or Firm—McGinn & Gibb, PLLC

(57) ABSTRACT

A liquid crystal display panel capable of avoiding display unevenness. The liquid crystal display panel is manufactured by a method comprising: preparing a pair of polarizer films each having at least a polyvinyl alcohol layer and a triacetyle cellulose layer; preparing a liquid crystal substrate assembly which comprises a first glass substrate and a second glass substrate and a liquid crystal material disposed between said first glass substrate and said second glass substrate; heating said polarizer films at a predetermined temperature for a predetermined time in a first heat treatment process; and sticking the polarizer films on the first and second glass substrates, after the first heat treatment process. The method may further comprises, after sticking the polarizer films on the first and second glass substrates, heating the liquid crystal substrate assembly in a second heat treatment process.

17 Claims, 7 Drawing Sheets

FIG. 6

| RATE OF MOISTURE REDUCTION (%) | SIZES OF LCD PANEL | | |
|---|---|---|---|
| | 10 inches | 14 inches | 18 inches |
| 0.55 | × | × | × |
| 1.00 | × | × | × |
| 1.20 | ○ | × | × |
| 1.35 | ○ | × | × |
| 1.46 | ○ | ○ | × |
| 1.60 | ○ | ○ | × |
| 2.00 | ○ | ○ | ○ |
| 2.05 | ○ | ○ | ○ |
| 2.35 | ○ | ○ | ○ |
| 2.46 | ○ | ○ | ○ |
| 2.65 | ○ | ○ | ○ |

○ : DISPLAY DEFECT WAS NOT DETECTED
× : DISPLAY DEFECT WAS DETECTED

INSPECTION OF DISPLAY DEFECTS

PRIOR ART

LIQUID CRYSTAL DISPLAY PANEL AVOIDING DISPLAY UNEVENNESS AND MANUFACTURING METHOD

FIELD OF THE INVENTION

The present invention relates generally to a liquid crystal display panel and a method of manufacturing the same, and more particularly to a method of manufacturing a liquid crystal display panel in which a warp in each of glass substrates of the liquid crystal display panel can be avoided to suppress display unevenness.

BACKGROUND OF THE INVENTION

With reference to the drawings, an explanation will be made on a conventional liquid crystal display panel or cell.

FIG. 8A is a cross sectional view illustrating a schematic structure of a conventional liquid crystal display panel, and FIG. 8B is a cross sectional view illustrating a schematic structure of a polarizer film used in the conventional liquid crystal display panel.

As shown in FIG. 8A, the conventional liquid crystal display panel 120 comprises a liquid crystal substrate assembly 110, and a pair of polarizer films 101a and 101b respectively stuck on both sides of the liquid crystal substrate assembly 110. The liquid crystal assembly 110 has a pair of glass substrates 102a and 102b. The glass substrates 102a and 102b are opposed to each other, and mutually joined via a sealing material portion 103a. Between the glass substrates 102a and 102b, there are disposed gap material portions or spacers not shown in the drawing. Also, the space between the glass substrates 102a and 102b is filled with a liquid crystal material. In FIG. 8A, a portion between the glass substrates 102a and 102b into which the liquid crystal material is injected is schematically shown as a liquid crystal layer 103.

Each of the polarizer films 101a and 101b comprises a film made of stretched polyvinyl alcohol into which iodine is doped or impregnated. Such film is hereafter called a PVA film or a PVA layer.

FIG. 8B is a cross sectional view illustrating a schematic structure of a polarizer film which is used in a conventional liquid crystal display panel and which is in a condition before sticking on the liquid crystal substrate assembly.

As shown in FIG. 8B, the polarizer film 101a on the side of a display surface has a multilayer structure which comprises, from the side of the surface stuck on the liquid crystal substrate assembly 110, a separator 104, a glue or adhesive layer 105, a triacetyle cellulose (TAC) layer 106a, a PVA layer 107, a TAC layer 106b, an antiglare (AG) layer 108, and a protective film 109. Also, the polarizer film 101b on the side of a backlight source has a structure similar to that of the polarizer film 101a shown in FIG. 8B, except that the AG layer 108 is not provided. Therefore, a detailed description on the polarizer film 101b is omitted here.

In the polarizer film 107a shown in FIG. 8B, the TAC layers 106a and 106b are stuck on both surfaces of the PVA layer 107 as a polarizer, and function as protective layers of the PVA layer 107. The protective layers of the PVA layer 107, that is, the TAC layers 106a and 106b, are provided for preventing the PVA layer 107 which is water-soluble from absorbing moisture in the air and from becoming much deteriorated thereby. As a material for the protective films of the PVA layer, triacetyle cellulose (TAC) is often used. The TAC film has a high transparency, and has superior optical isotropy. Considering these points, in the polarizing film of a liquid crystal display panel, the TAC film is a preferred material for a protective film of the PVA layer.

On the surface of the TAC layer 106a, which surface is to be stuck on the glass substrate 102a or 102b, there is formed a glue or adhesive layer 105. Further, a separator 104 is stuck on the adhesive layer 105. The separator 104 is used for protecting the adhesive layer 105 and is peelable therefrom.

Also, on the surface of the TAC layer 106b, which surface is opposite to the PVA layer 107, the AG layer 108 made of acrylic resin containing silicon particles is provided. Further, a protective film 109 for protecting the whole area of the polarizer film is stuck on the AG layer 108.

In the above-mentioned structure, the polarizer films 101a and 101b easily deform, that is, contract, due to heat treatment and the like. If the polarizer films 101a and 101b deform, each of the glass substrates 102a and 102b warps, and a gap between the glass substrates 102a and 102b varies depending on the location thereof. Thereby, there is a possibility of occurrence of deterioration or unevenness of a contrast ratio and brightness, and/or coloring in the liquid crystal display portion, that is, there is a possibility of occurrence of display unevenness. In the conventional liquid crystal display, such display unevenness caused the deterioration of display quality, display performance and reliability.

Especially, recently, the size of the display panel of the liquid crystal display has become large, and accordingly an optical film having a large area is used as a polarizer film. When the optical film having a large area is used as the polarizer film, the polarizer film is deformed more easily than the polarizer film constituted of the optical film having a smaller area, and a warp in the glass substrate and display unevenness caused by the deformation of the polarizer film appear remarkably.

Therefore, the deterioration of display performance, display quality and reliability caused by the deformation of the polarizer film was a large obstacle to the realization of a liquid crystal display having a large size.

In Japanese patent laid-open publication No. 59-226324, there is disclosed a method of sticking a polarizer film of a liquid crystal display panel. In the method disclosed in Japanese patent laid-open publication No. 59-226324, after sticking the polarizer films on a liquid crystal display panel, the liquid crystal display panel is disposed in a pressure vessel. Then, the liquid crystal display panel is pressurized in the air while heating the liquid crystal display panel at a particular temperature.

In the method disclosed in Japanese patent laid-open publication No. 59-226324, it is possible to easily remove minute bubbles produced between the polarizer films and the liquid crystal display panel when the polarizer films are stuck on the liquid crystal display panel.

However, in the method disclosed in Japanese patent laid-open publication No. 59-226324, during a heating process after sticking the polarizer films, the polarizer films, especially the TAC layers, contract or deform, and thereby a stress is produced in each of the polarizer films. By this stress, glass substrates of a liquid crystal display panel warp and the liquid crystal display panel itself deforms. Thereby, display unevenness, deterioration of a manufacturing yield and an increase in manufacturing costs are caused.

Therefore, in the conventional structures and methods, disadvantages of display unevenness caused by the deformation of the polarizer films in the liquid crystal display portion, and of deterioration of display performance, display quality and reliability of display were not obviated.

SUMMARY OF THE INVENTION

Therefore, it is an object of the present invention to obviate the disadvantages of the conventional liquid crystal display panel and the conventional method of manufacturing the same.

It is another object of the present invention to provide a liquid crystal display panel and a method of manufacturing the same in which deformation or contraction of polarizer films in a liquid crystal display panel can be suppressed.

It is still another object of the present invention to provide a liquid crystal display panel and a method of manufacturing the same in which a warp of glass substrates in a liquid crystal display panel can be suppressed.

It is still another object of the present invention to provide a liquid crystal display panel and a method of manufacturing the same in which display unevenness in a liquid crystal display panel can be suppressed.

It is still another object of the present invention to provide a liquid crystal display panel and a method of manufacturing the same in which deformation or contraction of polarizer films and a warp of glass substrates in a liquid crystal display panel can be avoided and, thereby, display unevenness can be suppressed.

It is still another object of the present invention to provide a liquid crystal display panel and a method of manufacturing the same in which display performance, display quality and reliability of a liquid crystal display can be improved.

It is still another object of the present invention to provide a liquid crystal display panel and a method of manufacturing the same in which manufacturing yield of a liquid crystal display can be improved and manufacturing cost thereof can be reduced.

According to an aspect of the present invention, there is provided a method of manufacturing a liquid crystal display panel comprising: preparing at least one polarizer films each having at least a polyvinyl alcohol layer and a triacetyle cellulose layer; preparing a liquid crystal substrate assembly which comprises a first glass substrate and a second glass substrate and a liquid crystal material disposed between the first glass substrate and the second glass substrate; heating the at least one polarizer films at a predetermined temperature for a predetermined time in a first heat treatment process; and sticking the at least one polarizer films on at least one of the first and second glass substrates, after performing the first heat treatment process.

Thereby, the contraction of the polarizer films caused by the contraction of the triacetyle cellulose (TAC) layer can be suppressed, and a warp in the glass substrates caused by the contraction of the polarizer films is also suppressed. Therefore, it is possible to suppress occurrence of display unevenness or display defects in a liquid crystal display panel or a liquid crystal display.

In this case, it is preferable that the method further comprises: after sticking the at least one polarizer films on at least one of the first and second glass substrates, heating the liquid crystal substrate assembly in which the at least one polarizer films are stuck on at least one of the first and second substrates, at a predetermined temperature for a predetermined time in a second heat treatment process.

Thereby, it becomes possible to remove minute bubbles or voids between the polarizer films and the glass substrates produced when the polarizer films are stuck on the glass substrates.

It is also preferable that the accuracy of flatness of the first and second glass substrates after the second heat treatment process is controlled to become equal to or higher than a predetermined value.

Thereby, a warp in the glass substrates of the liquid crystal display panel can be suppressed, so that it becomes possible to appropriately avoid display unevenness or display defects in the liquid crystal display panel or in the liquid crystal display.

It is further preferable that the rate of warp of the first and second glass substrates after performing the second heat treatment process is controlled to become equal to or smaller than a predetermined value.

Thereby, a warp in the glass substrates of the liquid crystal display panel can be suppressed, so that it becomes possible to appropriately avoid display unevenness or display defects in the liquid crystal display panel or in the liquid crystal display.

It is advantageous that the difference between a gap between the first and second glass substrates at the central portion of the liquid crystal display panel and a gap between the first and second glass substrates at the outermost portion of the liquid crystal display panel after performing the second heat treatment process is controlled to become substantially equal to or smaller than 0.2 $\mu$m.

By controlling the above-mentioned difference in this way, it is possible to avoid display unevenness or display defect appropriately, regardless of the sizes of the polarizer film, that is, the sizes of the liquid crystal display panel.

It is also advantageous that the rate of moisture reduction of the at least one polarizer films in the first heat treatment process is controlled to become equal to or larger than a predetermined value.

Thereby, contraction of the polarizer films after sticking them on the liquid crystal substrate assembly, especially contraction of the TAC layers of the polarizer films, can be easily and appropriately suppressed. Therefore, a warp in the glass substrates of the liquid crystal display panel can be avoided, so that it becomes possible to appropriately suppress display unevenness or display defects in the liquid crystal display panel or in the liquid crystal display.

It is further advantageous that the rate of moisture reduction of the at least one polarizer films in the first heat treatment process is controlled to become equal to or larger than a predetermined value which depends on the size of the at least one polarizer film.

Thereby, regardless of the sizes of the polarizer films, it is possible to easily and appropriately avoid deformation and warp in the glass substrates, so that it becomes possible to suppress display unevenness or display defects in the liquid crystal display panel or in the liquid crystal display.

It is preferable that the rate of moisture reduction of the at least one polarizer films in the first heat treatment process is controlled to become equal to or larger than a predetermined value which depends on the size of the at least one polarizer film, by controlling the heating temperature and/or the heating time of the first heat treatment process.

It is also preferable that the at least one polarizer films comprise a first polarizer film and a second polarizer film; and wherein, in the sticking the at least one polarizer films on at least one of the first and second glass substrates after the first heat treatment process, the first polarizer film is stuck on the first glass substrate and the second polarizer film is stuck on the second glass substrate.

It is further preferable that the rate of moisture reduction of the at least one polarizer films in the first heat treatment process is controlled to become equal to or larger than a predetermined value which depends on the size of the at least one polarizer film, thereby the accuracy of flatness of the first and second glass substrates after the second heat treatment process is controlled to become equal to or higher than a predetermined value.

It is advantageous that the rate of moisture reduction of the at least one polarizer films in the first heat treatment process is controlled to become equal to or larger than a predetermined value which depends on the size of the at least one polarizer film, thereby the rate of warp of the first and second glass substrates after the second heat treatment process is controlled to become equal to or smaller than a predetermined value.

It is also advantageous that the rate of moisture reduction of the at least one polarizer films in the first heat treatment process is controlled to become equal to or larger than a predetermined value which depends on the size of the at least one polarizer film, thereby the difference between a gap between the first and second glass substrates at the central portion of the liquid crystal display panel and a gap between the first and second glass substrates at the outermost portion of the liquid crystal display panel after the second heat treatment process is controlled to become substantially equal to or smaller than 0.2 $\mu$m.

According to another aspect of the present invention, there is provided a liquid crystal display panel comprising: a first glass substrate and a second glass substrate opposed to each other; a liquid crystal material filling the space between the first and second glass substrates; a first polarizer film which is disposed on the outside surface of the first glass substrate and which comprises at least a polyvinyl alcohol layer and a triacetyle cellulose layer; and a second polarizer film which is disposed on the outside surface of the second glass substrate and which comprises at least a polyvinyl alcohol layer and a triacetyle cellulose layer; wherein the first and second polarizer films being stuck on the first and second glass substrates, respectively, after heating the first and second polarizer films at a predetermined temperature and for a predetermined time.

Thereby, the contraction of the polarizer films caused by the contraction of the triacetyle cellulose (TAC) layer can be suppressed, and a warp in the glass substrates caused by the contraction of the polarizer films is also suppressed. Therefore, it is possible to suppress occurrence of display unevenness or display defects in a liquid crystal display panel or a liquid crystal display.

In this case, it is preferable that the liquid crystal display panel is heated at a predetermined temperature and for a predetermined time, after sticking the first and second polarizer films on the first and second glass substrates, respectively.

Thereby, it becomes possible to remove minute bubbles or voids between the polarizer films and the glass substrates produced when the polarizer films are stuck on the glass substrates.

It is also preferable that the accuracy of flatness of the first and second glass substrates is controlled to become equal to or higher than a predetermined value.

Thereby, a warp in the glass substrates of the liquid crystal display panel can be suppressed, so that it becomes possible to appropriately avoid display unevenness or display defects in the liquid crystal display panel or in the liquid crystal display.

It is further preferable that the rate of warp of the first and second glass substrates is controlled to become equal to or smaller than a predetermined value.

Thereby, a warp in the glass substrates of the liquid crystal display panel can be suppressed, so that it becomes possible to appropriately avoid display unevenness or display defects in the liquid crystal display panel or in the liquid crystal display.

It is advantageous that the difference between a gap between the first and second glass substrates at the central portion of the liquid crystal display panel and a gap between the first and second glass substrates at the outermost portion of the liquid crystal display panel is controlled to become substantially equal to or smaller than 0.2 $\mu$m.

By controlling the above-mentioned difference in this way, it is possible to avoid display unevenness or display defect appropriately, regardless of the sizes of the polarizer film, that is, the sizes of the liquid crystal display panel.

It is also advantageous that the rate of moisture reduction of the first and second polarizer films when the first and second polarizer films are heated at a predetermined temperature and for a predetermined time before sticking the first and second polarizer films on the first and second glass substrates, respectively, is controlled to become equal to or larger than a predetermined value.

Thereby, contraction of the polarizer films after sticking them on the liquid crystal substrate assembly, especially contraction of the TAC layers of the polarizer films, can be easily and appropriately suppressed. Therefore, a warp in the glass substrates of the liquid crystal display panel can be avoided, so that it becomes possible to appropriately suppress display unevenness or display defects in the liquid crystal display panel or in the liquid crystal display.

It is further advantageous that the rate of moisture reduction of the first and second polarizer films when the first and second polarizer films are heated at a predetermined temperature and for a predetermined time before sticking the first and second polarizer films on the first and second glass substrates, respectively, is controlled to become equal to or larger than a predetermined value which depends on the size of the first and second polarizer films.

Thereby, regardless of the sizes of the polarizer films, it is possible to easily and appropriately avoid deformation and warp in the glass substrates, so that it becomes possible to suppress display unevenness or display defects in the liquid crystal display panel or in the liquid crystal display.

It is also preferable that the rate of moisture reduction of the first and second polarizer films is controlled to become equal to or larger than a predetermined value, by controlling the heating temperature and/or the heating time when the first and second polarizer films are heated at a predetermined temperature and for a predetermined time before sticking the first and second polarizer films on the first and second glass substrates, respectively.

BRIEF DESCRIPTION OF THE DRAWINGS

These and other features, and advantages, of the present invention will be more clearly understood from the following detailed description taken in conjunction with the accompanying drawings, in which like reference numerals designate identical or corresponding parts throughout the figures, and in which:

FIG. 6 is a table showing a result of measuring display defects with respect to rates of moisture reduction in the polarizer film according to the present invention;

DESCRIPTION OF A PREFERRED EMBODIMENT

Figure 1:
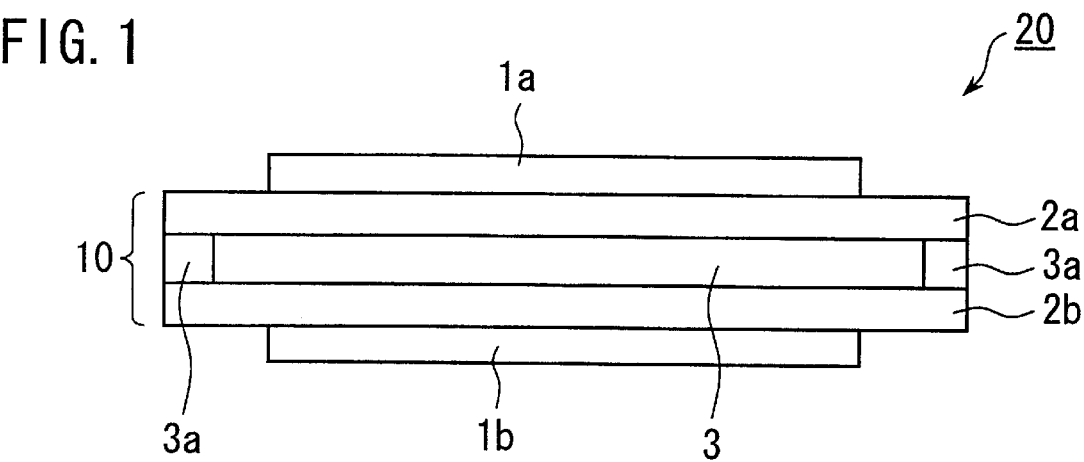
FIG. 1 is a cross sectional view of a liquid crystal display panel according to an embodiment of the present invention.

With reference to the drawings, a description will be made on a liquid crystal display panel or cell and a method of manufacturing the liquid crystal display panel according to an embodiment of the present invention. In the description, where considered appropriate, reference numerals have been repeated among the drawings to indicate corresponding or analogous elements.

FIG. 1 is a schematic cross sectional view of a liquid crystal display panel according to an embodiment of the present invention.

As shown in FIG. 1, the liquid crystal display panel 20 according to this embodiment comprises a liquid crystal substrate assembly 10, and a pair of polarizer films 1a and 1b respectively stuck on both sides of the liquid crystal substrate assembly 10. The liquid crystal substrate assembly 10 has a pair of glass substrates 2a and 2b. The glass substrates 2a and 2b are opposed to each other, and mutually joined via a sealing material portion 3a. Between the glass substrates 2a and 2b, there are disposed gap material portions or spacers not shown in the drawing. Also, the space between the glass substrates 2a and 2b is filled with a liquid crystal material. In FIG. 1, a portion between the glass substrates 2a and 2b into which the liquid crystal material is injected is schematically shown as a liquid crystal layer 3.

Also, similarly to a conventional liquid crystal display panel, data electrodes and color filters, and scanning electrodes are formed on the opposing surfaces of the pair of glass substrates 2a and 2b, that is, on the surfaces of the glass substrates 2a and 2b on the sides of the liquid crystal layer 3. Here, the data electrodes and color filters are formed on the glass substrate 2a which is on the side of a display surface and on which the polarizer film 1a is stuck, and the scanning electrodes are formed on the glass substrate 2b which is on the side of a backlight source and on which the polarizer film 1b is stuck.

Figure 2:
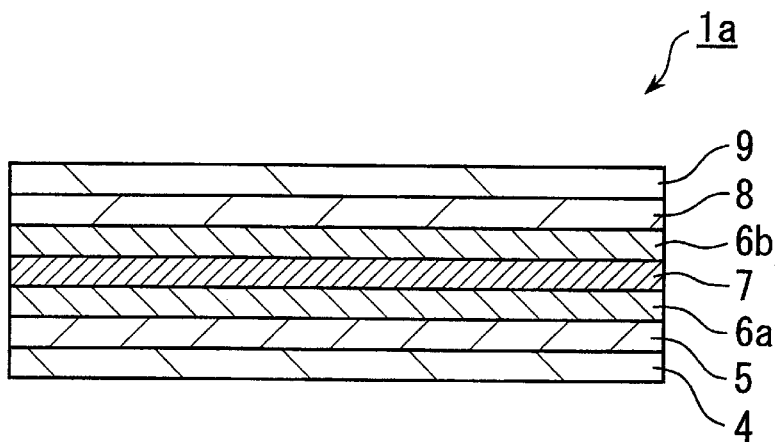
FIG. 2 is a cross sectional view of a polarizer film used in the liquid crystal display panel of FIG. 1.

FIG. 2 is a cross sectional view showing a schematic structure of a polarizer film, for example, 1a, used in the liquid crystal display panel according to the present embodiment, before sticking the polarizer film on the liquid crystal substrate assembly 10.

The polarizer film 1a shown in FIG. 2 comprises one PVA layer 7, a pair of TAC layers 6a and 6b, and layers of other components. The PVA layer 7 is constituted, for example, of a film made of a stretched polyvinyl alcohol into which iodine and the like is doped or impregnated. The PVA layer 7 is disposed approximately at the central portion of the polarizer film 1a, and the TAC layers 6a and 6b are disposed directly on both sides of the PVA layer 7. The layers of other components may be disposed, if necessary.

More particularly, the polarizer film 1a on the side of the display surface has the following structure. As shown in FIG. 2, the polarizer film 1a on the side of the display surface has a multilayer structure which comprises, from the side of the surface stuck on the liquid crystal substrate assembly 10, a separator 4, a glue or adhesive layer 5, a triacetyle cellulose (TAC) layer 6a, a PVA layer 7, a TAC layer 6b, an antiglare (AG) layer 8, and a protective film 9. Also, the polarizer film 1b on the side of a backlight source has a structure similar to that of the polarizer film 1a shown in FIG. 2, except that the AG layer 8 is not provided. Therefore, a detailed description on the polarizer film 1b is omitted here.

The PVA layer 7 is a layer for polarizing light from a backlight source not shown in the drawing. The TAC layers 6a and 6b are stuck on both surfaces of the PVA layer 7 as a polarizer, and function as protective layers of the PVA layer 7. The protective layers of the PVA layer 7, that is, the TAC layers 6a and 6b, are provided for preventing the PVA layer 7 which is water-soluble from absorbing moisture in the air and from becoming much deteriorated thereby. Triacetyle cellulose (TAC) is a material having high transparency and having superior optical isotropy. Considering these points, in the polarizing film of a liquid crystal display panel, the TAC is a preferred material for protective layers of the PVA layer.

On the surface of the TAC layer 6a, which surface is to be stuck to the glass substrate 102a or 102b, there is formed a glue or adhesive layer 5. Further, a separator 4 is stuck on the adhesive layer 5. The separator 4 is used for protecting the adhesive layer 5 and is made of a transparent film and the like. The separator 4 is peelable from the adhesive layer 5.

When the polarizer films 1a and 1b are stuck on the liquid crystal substrate assembly 10, that is, on the glass substrates 2a and 2b, the separators 4 of the polarizer films 1a and 1b are peeled and the polarizer films 1a and 1b are stuck on the glass substrates 2a and 2b, respectively, by the exposed adhesive layers 5.

Also, on the surface of the TAC layer 6b of the polarizer film 1a, which surface is opposite to the PVA layer 7, there is provided an AG layer 8. The AG layer 8 is a transparent film into which spherical particles are mixed. For example, the AG layer 8 is formed by applying acrylic resin or acrylic resin adhesive agent containing silicon particles on the TAC layer 6b. AG layer 8 appropriately reflect light diffusely, and makes display elements clearly readable at the surface of the liquid crystal display panel. Therefore, the AG layer 8 is stuck on the polarizer film 1a on the side of display surface, but it is not necessary to dispose the AG layer 8 on the polarizer film 1b on the side of the backlight source. Also, it is possible to omit the AG layer 8 from both polarizer films 1a and 1b, and to make the structure of both polarizer films 1a and 1b same.

Further, a protective film 9 is disposed on the AG layer 8 of the polarizer film 1a to protect whole the polarizer film 1a. With respect to the polarizer film 1b on which the AG layer 8 is not provided, the protective film 9 is disposed on the TAC layer 6b. It should be noted that, after the polarizer films 1a and 1b are stuck on the liquid crystal substrate assembly 10, the protective films 9 are eventually removed.

Now, with reference to the drawings, an explanation will be made on a method of manufacturing a liquid crystal display panel according to an embodiment of the present invention, especially on a method of sticking polarizer films of the liquid crystal display panel.

First, the polarizer films 1a and 1b and the liquid crystal substrate assembly 10 having the above-mentioned structure are prepared.

Then, before sticking the polarizer films 1a and 1b on the liquid crystal substrate assembly 10, the polarizer films 1a and 1b are disposed within an appropriate heating chamber, preferably within an incubator or a thermostatic bath, and are heated, that is, the first heating or heat treatment process is performed.

Figure 3A:
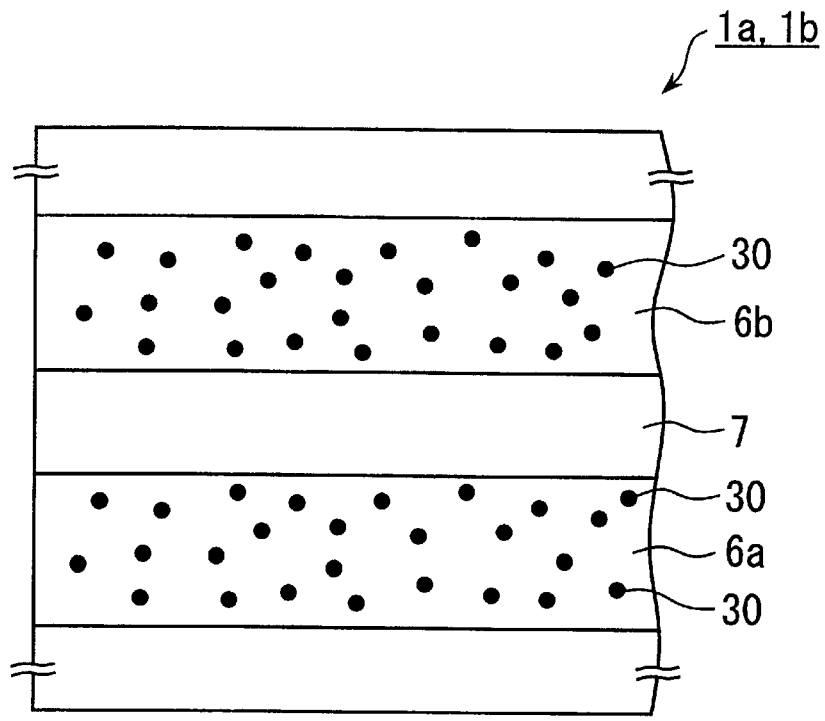
FIG. 3A and FIG. 3B are partial enlarged cross sectional views each schematically showing behavior of moisture in the polarizer film shown in FIG. 2.
Figure 3B:
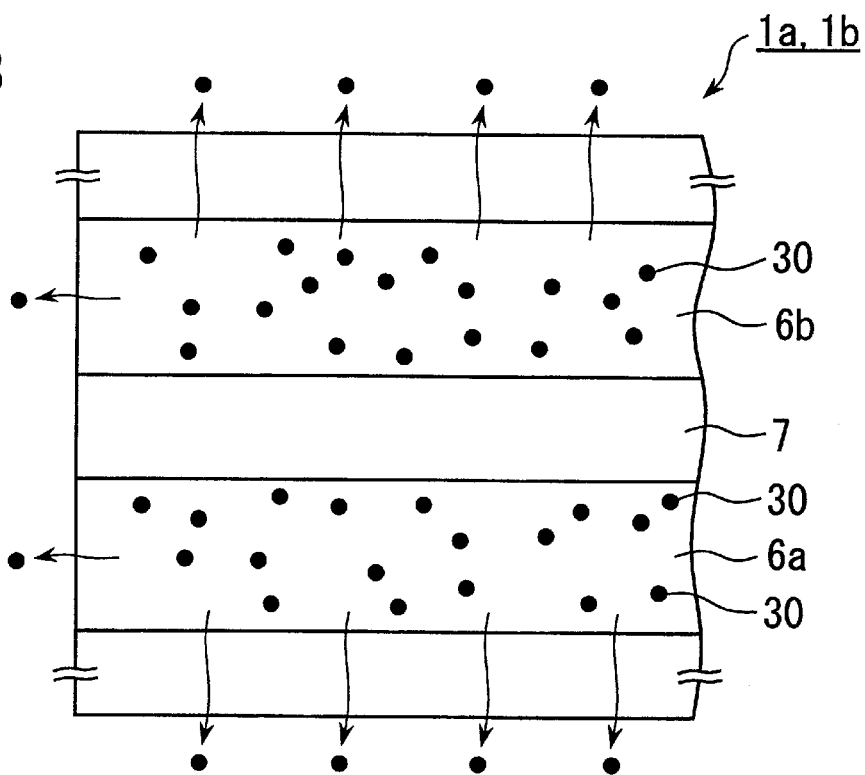

FIG. 3A and FIG. 3B are partial enlarged cross sectional views each schematically showing behavior of moisture in the polarizer film shown in FIG. 2. For the sake of simplicity, in FIGS. 3A and 3B, components of the polarizer film other than the TAC layer 6a, the PVA layer 7 and the TAC layer 6b are not illustrated. Also, FIG. 3A shows a condition of the polarizer film before the first heat treatment process, and FIG. 3B shows a condition of the polarizer film after the first heat treatment process.

As shown in FIG. 3A, before the first heat treatment process, the TAC layers 6a and 6b contain a certain amount of moisture 30. As shown in FIG. 3B, by the first heat treatment process, the moisture contained in the TAC layer 6a and 6b diffuses within the TAC layers 6a and 6b and a part of the moisture 30 evaporates. That is, a part of the moisture 30 within the TAC layers 6a and 6b is emitted outside via the adjacent layers or via exposed side surfaces of the TAC layers 6a and 6b.

The temperature, heating time and the like in the first heat treatment process are controlled such that the rate of moisture reduction in each of the polarizer films 1a and 1b becomes equal to or larger than a predetermined value. That is, the condition of the first heat treatment process is adjusted such that moisture content of each of the polarizer films 1a and 1b after the first heat treatment process becomes equal to or smaller than a predetermined value.

Here, the rate of moisture reduction is the proportion of moisture removed from the polarizer film by heating the polarizer film to the total weight of the polarizer film. It is difficult to measure the rate of moisture reduction of the TAC layer itself which is considered to contain the largest amount of moisture. Therefore, in the present invention, the rate of moisture reduction is defined as the rate of variation of total weight or mass of the polarizer film caused by the heat treatment.

Concretely, the rate of moisture reduction is a rate of variation of weight of a polarizer film to be measured caused by the heat treatment with respect to the total weight of the polarizer film before the heat treatment, as shown by the following equation.

Rate of moisture reduction (%)=100×{weight (kg) of polarizer film before the first heat treatment process−weight (kg) of polarizer film after the first heat treatment process}/{weight (kg) of polarizer film before the first heat treatment process}

The predetermined value of the rate of moisture reduction of the polarizer film mentioned above can be determined, for example, by experiment or simulation, considering a worst permissible display unevenness or display defect into consideration.

Figure 4:
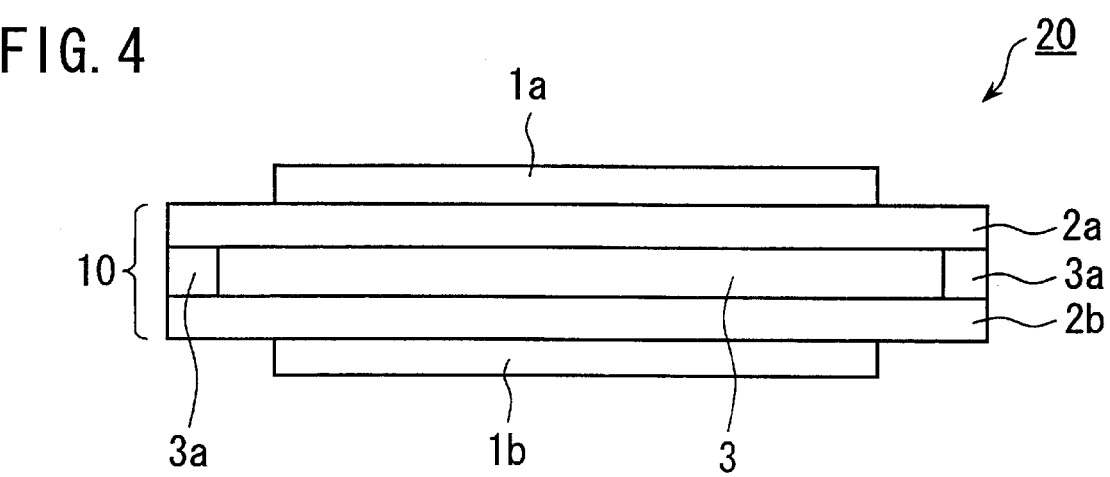
FIG. 4 is a cross sectional view of a liquid crystal display panel according to an embodiment of the present invention after sticking the polarizer films thereon.

Next, as shown in FIG. 4, the separator 4 is peeled from each of the polarizer films 1a and 1b, and the polarizer films 1a and 1b are stuck on both sides of the liquid crystal substrate assembly 10, that is, on the glass substrates 2a and 2b, respectively, via the exposed adhesive layers 5.

Thereafter, in order to remove voids or bubbles produced between the polarizer film 1a and the glass substrate 2a and between the polarizer film 1b and the glass substrate 2b, the liquid crystal substrate assembly 10 on which the polarizer films 1a and 1b are stuck, i.e., the liquid crystal display panel 20, is heated, that is, the second heat treatment process is performed.

In the second heat treatment process, in order to avoid deformation of the polarizer films 1a and 1b themselves, it is preferable that the temperature of the heat treatment is equal to or lower than 100 degrees Celsius. Also, the heating time is preferably at least equal to or longer than approximately 2 minutes, and more preferably it is equal to or longer than 10 minutes.

If necessary, the liquid crystal display panel 20 may be disposed, for example, in a sealed container coupled with a rotary pump, a dry pump or the like, and the sealed container may be either depressurized or pressurized. Alternatively, both the depressurization and pressurization may be used. When the sealed container is pressurized, the applied pressure is usually approximately 1–6 kgf/cm². The medium used for the pressurization may be a fluid, such as air and the like.

In this way, by the second heat treatment process mentioned above, it is possible to remove bubbles between the polarizer film 1a and the glass substrate 2a caused by the unevenness of the surface or surfaces of the polarizer film 1a and/or the glass substrate 2a. It is also possible to remove bubbles between the polarizer film 1b and the glass substrate 2b caused by the unevenness of the surface or surfaces of the polarizer film 1b and/or the glass substrate 2b.

By the manufacturing process mentioned above, a liquid crystal display panel is fabricated which comprises a liquid crystal substrate assembly having a pair of glass substrates and a liquid crystal material layer filling a space therebetween, and polarizer films stuck on both sides of the liquid crystal substrate assembly.

Then, by using the liquid crystal display panel fabricated as mentioned above, a liquid crystal display can be fabricated according to a conventional method of manufacturing a liquid crystal display, but a detailed explanation thereof is omitted here.

According to the present embodiment, it is possible to decrease the moisture content of the polarizer films, especially the TAC layers, by the heat treatment of the polarizer films before sticking the polarizer films on the glass substrates. Therefore, the polarizer films hardly contract after the polarizer films are stuck on the glass substrates. For example, the polarizer films hardly contract due to the above-mentioned second heat treatment process. Also, even if the abovementioned second heat treatment is not performed, there is a possibility that the liquid crystal display panel or the liquid crystal display is kept in a high temperature condition during a manufacturing process, storage or use thereof. Even in such case, the polarizer films stuck on the glass substrates hardly contract.

Therefore, it is possible to avoid a warp in each of the glass substrates of the liquid crystal display panel, and to keep the width of the gap between the glass substrates substantially constant. That is, in the liquid crystal display panel fabricated in accordance with this embodiment, it is possible to control the precision or accuracy of flatness of the glass substrates equal to or higher than a predetermined value and also to control the rate of warp of the glass substrates within a predetermined value.

Here, the precision or accuracy of flatness of the glass substrate is defined as follows. First, distances are measured from various points on a glass substrate to be inspected to a flat surface on which the glass substrate is put immovably. Then, the area of one glass substrate is divided by the square of the above-mentioned distances to obtain various quotients. The accuracy of flatness of the glass substrate is defined as the minimum value of the various quotients.

In this case, the predetermined value of the accuracy of flatness of the glass substrate mentioned above can be determined, for example, by experiment or simulation, considering a worst permissible display unevenness or display defect into consideration.

Also, the rate of warp of the glass substrate is defined as follows. First, distances are measured from various points on a glass substrate to be inspected to a flat surface on which the glass substrate is put immovably. Then, the above-mentioned distances are divided by the length in the longitudinal direction of the glass substrate to obtain various quotients. The rate of warp of the glass substrate is defined as the maximum value of the various quotients. In case the glass substrate has a square shape, the above-mentioned distances are divided by the length of any one side of the glass substrate to obtain various quotients, and the rate of warp of the glass substrate is defined as the maximum value of the various quotients.

The predetermined value of the rate of warp of the glass substrate mentioned above can be determined, for example, by experiment or simulation, considering a worst permissible display unevenness or display defect into consideration.

Thus, according to the present embodiment, it is possible to suppress occurrence of display unevenness, and to greatly improve display quality, performance and reliability of a liquid crystal display as compared with the conventional manufacturing method.

As mentioned above, according to a liquid crystal display panel and a method of manufacturing the liquid crystal display panel of the present embodiment, the contraction of the TAC layers 6a and 6b after sticking the polarizer films on the glass substrates and the contraction of the polarizer films 1a and 1b caused thereby can be effectively suppressed. Also, the warp in the glass substrates 2a and 2b caused by the contraction of the polarizer films 1a and 1b can be suppressed. Therefore, it is possible to control the accuracy of flatness of the glass substrates of the liquid crystal display panel equal to or higher than a predetermined value and also to control the rate of warp of the glass substrates within a predetermined value. Further, bubbles do not exist between the polarizer film 1a and the glass substrate 2a and between the polarizer film 1b and the glass substrate 2b. Thus, it is possible to suppress occurrence of display unevenness, and to greatly improve display quality, performance and reliability of a liquid crystal display as compared with the conventional manufacturing method.

EXAMPLE

With reference to the drawings, a description will now be made on an example of a method of manufacturing the liquid crystal display panel according to the present invention and the like.

First, a plurality of polarizer films which have substantially the same size and the same structure, for example, the structure shown in FIG. 2, were prepared. Then, a weight of each polarizer film was measured. In order to remove moisture contained in the polarizer films, the polarizer films were left in an incubator kept at a predetermined temperature for a predetermined time. This heat treatment corresponds to the above-mentioned first heat treatment process. Every time after elapsing a predetermined time, one polarizer film was taken out of the incubator, and the weight of the polarizer film was measured. From the difference of the weights of the polarizer film before and after the heating, the rate of moisture reduction of the polarizer film was calculated.

Figure 5:
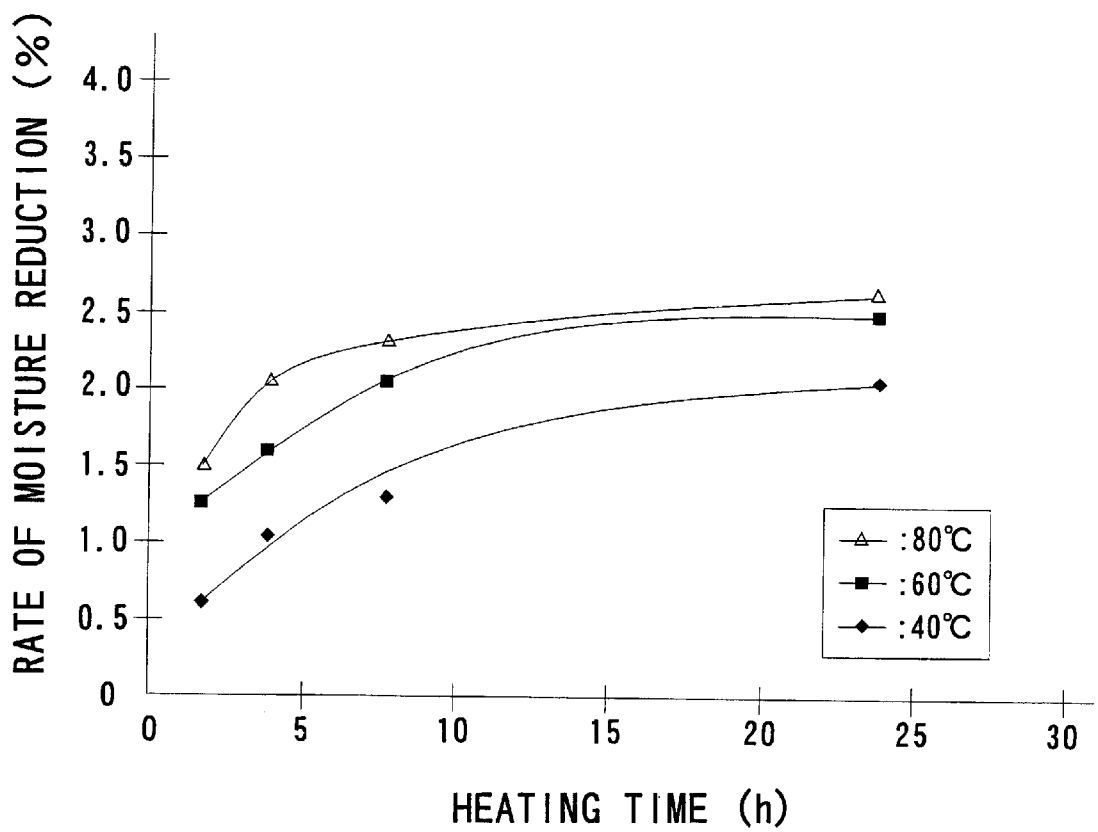
FIG. 5 is a graph showing rates of moisture reduction with respect to time and temperature in the polarizer film according to the present invention.

FIG. 5 is a graph showing the rates of moisture reduction with respect to time and temperature. The ordinate of the graph shows the rates of moisture reduction of the polarizer films, and the abscissa of the graph shows times during which polarizer films were left in the incubator, that is, heating times. The temperatures in the incubator, that is, the heating temperatures of the polarizer films, were set to 40, 60 and 80 degrees Celsius respectively, and, in the graph, there are shown three curves corresponding to the respective temperatures. The humidity in the incubator was set to 30 percent throughout the process, and all the polarizer films used have substantially the same structure and size.

Among the layers constituting each polarizer film, it is considered that the TAC layer contains the most moisture. However, it is difficult to measure the rate of moisture reduction within only the TAC layer. Therefore, in this embodiment, the rate of moisture reduction of the polarizer film was measured from the rate of change in weights of the polarizer film before and after the heat treatment.

As shown in FIG. 5, the rate of moisture reduction of the polarizer film disposed in an incubator becomes larger as the heating temperature becomes higher, and converges toward a predetermined value which depends on the heating temperature. For example, when the heating temperature is 40 degrees Celsius, the rate of moisture reduction of the polarizer film becomes large as the heating time becomes long, and converges toward approximately 2 percent.

Therefore, when the polarizer films have substantially the same size and structure, it is possible to control the rate of moisture reduction of the polarizer films approximately to a desired value, although some dispersion may exist. Also, by adjusting the heating time of the first heat treatment process, it is possible to control the rate of moisture reduction of the polarizer film to a desired value. Further, by adjusting both the heating temperature and the heating time, it is possible to control the rate of moisture reduction of the polarizer film to a desired value.

Additionally, with respect to the polarizer films having various sizes and structures, it is possible to previously obtain data on dependence of the rate of moisture reduction of polarizer films on the heating temperature and/or the heating time. By using such data on dependence, it is possible to control the rate of moisture reduction of the polarizer film having a desired size and structure to a desired value, by adjusting the heating temperature and/or the heating time of the first heat treatment process.

Next, the separators were peeled off the polarizer films which were heat treated as mentioned above, and the polarizer films were stuck on both sides of the liquid crystal substrate assembly, that is, on the two glass substrates, by the exposed adhesive layers. Thereafter, the liquid crystal substrate assembly on which the polarizer films were stuck, that is, the liquid crystal display panel, was heat treated. This heat treatment corresponds to the above-mentioned second heat treatment process. In this example, the liquid crystal display panel was left within an incubator for 8 hours, and the temperature in the incubator was set to 60 degrees Celsius.

By using the liquid crystal display panels heat treated as mentioned above, liquid crystal displays were fabricated, and display defect of each liquid crystal display, that is, each liquid crystal display panel, was inspected. FIG. 6 is a table showing a result of measuring display defects of the liquid crystal display panels. FIG. 6 shows existence and non-existence of the display defects when the rate of moisture reduction of the polarizer films in the first heat treatment process was changed, in each of the liquid crystal display panels having the sizes corresponding to 10 inches, 14 inches and 18 inches.

Here, the decision on whether or not a liquid crystal display panel has the display defect can be done as follows. For example, it is possible to use a predetermined image displayed by a normal liquid crystal display having a standard quality as a reference. The predetermined image is also displayed by a liquid crystal display panel to be tested. It is determined visually and sensuously whether or not the difference between the images displayed by the standard liquid crystal display panel and by the liquid crystal display panel to be tested is larger than a predetermined amount, thereby the test of the liquid crystal display panel is performed. It is also possible to use a photograph of such displayed image as a reference. Alternatively, a predetermined image is displayed by a liquid crystal display having a liquid crystal display panel to be tested, and the displayed image is compared visually and sensuously with a predetermined sample image having the worst permissible display quality, that is, a sample image having a threshold quality. It is also possible to use a photograph of such displayed image as a sample image.

As apparent from the table of FIG. 6, the rate of moisture reduction of the polarizer film as a threshold value above which rate the display defects do not occur depends on the size of the liquid crystal display panel. For example, in the liquid crystal display panel having a size corresponding to 10 inches, if the rate of moisture reduction of the polarizer film in the first heat treatment process is approximately equal to or larger than 1.2 percent, the display defect does not occur. As another example, in the liquid crystal display panel having a size corresponding to 18 inches, if the rate of moisture reduction of the polarizer film in the first heat treatment process is approximately equal to or larger than 2 percent, the display defect does not occur. Therefore, in order to eliminate the defects of display, it is necessary to make the rate of moisture reduction of the polarizer film in the first heat treatment process larger as the size of the liquid crystal display panel becomes larger.

As mentioned above, it is possible to control the rate of moisture reduction of the polarizer film having a given size and structure to a desired value, by adjusting the heating temperature and/or heating time of the first heat treatment process. Also, the size of the polarizer film corresponds to the size of the liquid crystal display panel. Therefore, depending on the size of the liquid crystal display panel, that is, the size of the polarizer film, the heating temperature and/or the heating time of the polarizer film in the first heat treatment process are adjusted to control the rate of moisture reduction of the polarizer film. Thereby, it becomes possible to suppress occurrence of display defects, and to fabricate a liquid crystal display panel and a liquid crystal display using the liquid crystal display panel, with improved display quality, performance and reliability. Also, according to the present invention, the rate of moisture reduction can be controlled by adjusting the heating temperature and/or heating time of the first heat treatment process, and, therefore, it is possible to control the rate of moisture reduction of the polarizer film easily and without complicating the manufacturing process and to appropriately avoid occurrence of display defects.

It is possible to previously determine, depending on the sizes of the polarizer film and the like, the appropriate values of the rates of moisture reduction of the polarizer film in the first heat treatment process, by experiment and/or simulation, and to control the rate of moisture reduction of the polarizer film to the previously determined appropriate value in a mass production process. Alternatively, it is possible to previously determine, depending on the size of the polarizer film and the like, the appropriate values of the heating temperature and/or the heating time of the polarizer film in the first heat treatment process, by experiment and/or simulation, and to control the heating temperature and/or the heating time of the polarizer film to the previously determined appropriate values in a mass production process.

Figure 7:
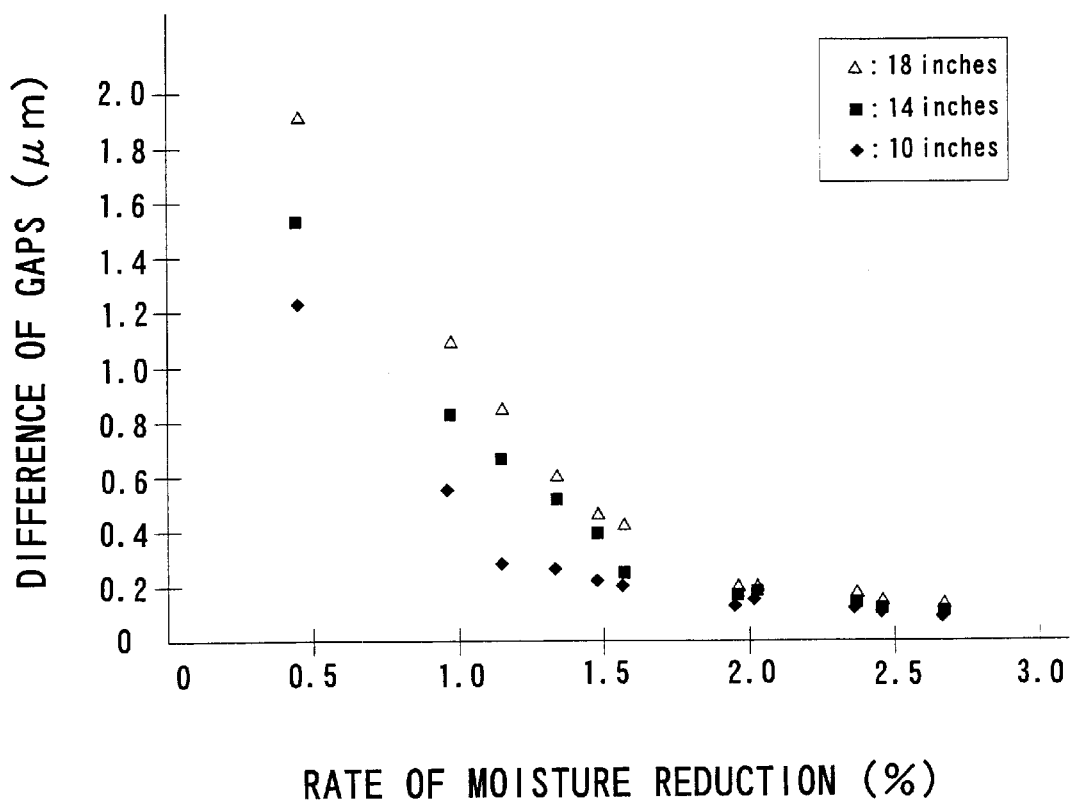
FIG. 7 is a graph showing a relationship between gap variation and rates of moisture reduction in the polarizer film according to the present invention.
Figure 8A:
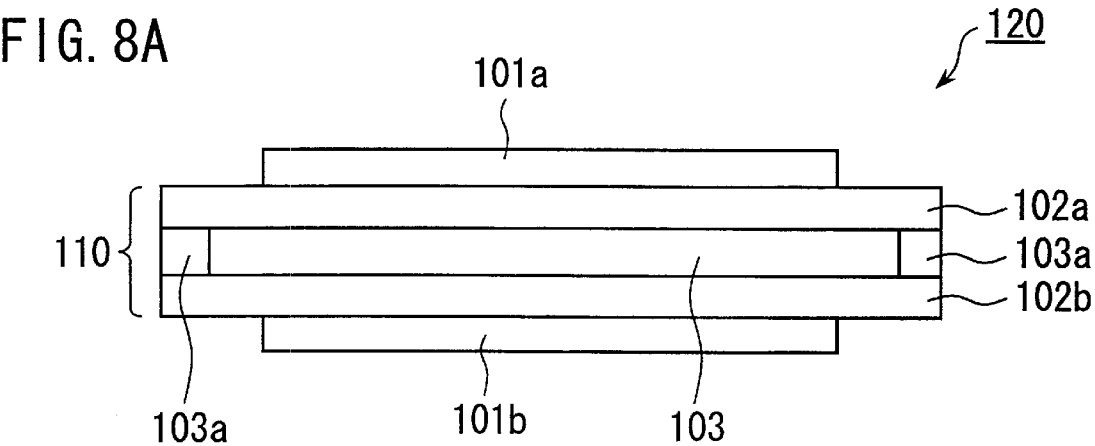
FIG. 8A and FIG. 8B are cross sectional views of a conventional liquid crystal display panel and a polarizer film used in the conventional liquid crystal display panel, respectively.
Figure 8B:
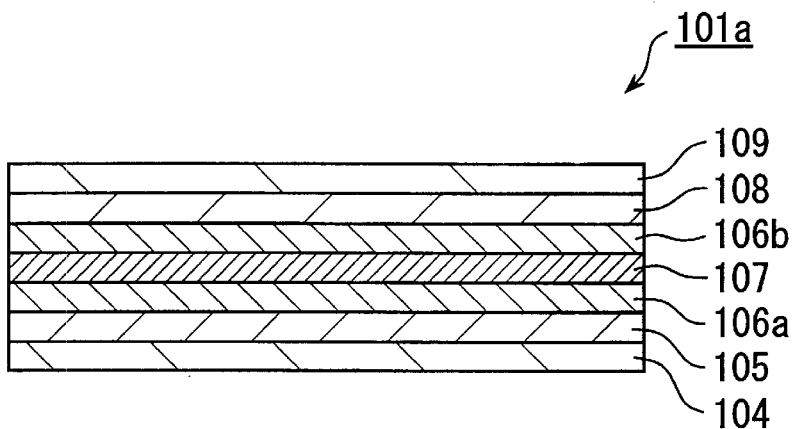

Usually, in an area near the central portion of a liquid crystal display panel, an influence of the contraction of the polarizer film on the display quality is relatively small and display operation is performed normally. On the other hand, in the outermost portion of the liquid crystal display panel, the contraction of the polarizer film gives the largest influence on the display quality and defects of display are apt to occur. FIG. 7 is a graph showing mutual relationships between differences between the gaps at the outermost portions and the gaps at the center portions of liquid crystal display panels, and the rates of moisture reduction of the polarizer films in the first heat treatment process. Here, the gap of the liquid crystal display panel corresponds to a space or distance between the two glass substrates mutually combined to form the liquid crystal display panel. An ordinate of the graph of FIG. 7 designates the differences between the gaps at the outermost portions of the liquid crystal display panels and the gaps at the center portions thereof. An abscissa of the graph of FIG. 7 designates the rates of moisture reduction in the first heat treatment process. In FIG. 7, the above-mentioned relationships are shown for three kinds of liquid crystal display panels having the sizes corresponding to 10 inches, 14 inches and 18 inches.

From the graph of FIG. 7, it can be seen that, as the size of a liquid crystal display panel, i.e., the size of a polarizer film, becomes larger, the difference between the gap at the outermost portion of the liquid crystal display panel and the gap at the central portion thereof becomes larger, that is, a warp in the glass substrates becomes larger. Also, it can be seen that, as the rate of moisture reduction of the polarizer film in the first heat treatment process becomes larger, the difference between the gap at the outermost portion of the liquid crystal display panel and the gap at the central portion thereof becomes smaller, that is, the warp in the glass substrates of the liquid crystal display panel is suppressed more.

When the table of FIG. 6 and the graph of FIG. 7 are considered together, it can be seen that if the difference between the gap at the outermost portion of the liquid crystal display panel and the gap at the central portion thereof is equal to or smaller than approximately 0.2 $\mu$m, display defect does not occur, regardless of the sizes of the liquid crystal display panel.

From the above, it can be understood that, due to the first heat treatment process performed before sticking the polarizer films on the liquid crystal display panel, the moisture contained in the polarizer films, especially in the TAC layers, is reduced, and, thereby, the contraction of the polarizer films and the warp in the glass substrates caused by any heat treatment and the like after sticking the polarizer films on the liquid crystal display panel are suppressed and display defects can be avoided.

That is, in the liquid crystal display panel in which the polarizer films heat treated by the above-mentioned first heat treatment process are stuck on the glass substrates, display defects are not caused by the heat treatment process thereafter, for example, the above-mentioned second heat treatment process or other heat treatment process or by the storage or use under a high temperature environment, and the like. Thereby, it is possible to obtain a liquid crystal display panel having superior display performance, display quality and reliability. Also, it is possible to improve a manufacturing yield of a liquid crystal display panel and to reduce a manufacturing cost thereof.

As mentioned above, in a liquid crystal display panel and a method of manufacturing the liquid crystal display panel according to the present invention, it is possible to avoid the contraction of the polarizer films, especially the TAC layers thereof, and to avoid the warp in the glass substrates caused by the contraction of the polarizer films. Also, by adjusting the rate of moisture reduction or the moisture content of the polarizer films depending on the size and/or the structure of the polarizer films, it is possible to control the accuracy of flatness of the glass substrates of the liquid crystal display panel to become higher than a predetermined value. According to the present invention, since the warp in the polarizer films and the glass substrates can be suppressed, it is possible to avoid occurrence of the display defects such as the display unevenness and the like in the liquid crystal display portion. Therefore, it is possible to fabricate a liquid crystal display panel having superior display performance, display quality and reliability. Also, it is possible to improve a manufacturing yield of a liquid crystal display panel and to reduce a manufacturing cost thereof.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative sense rather than a restrictive sense, and all such modifications are to be included within the scope of the present invention. Therefore, it is intended that this invention encompasses all of the variations and modifications as fall within the scope of the appended claims.

What is claimed is:

1. A method of manufacturing a liquid crystal display panel, said method comprising:

preparing at least one polarizer film, each said film having at least a polyvinyl alcohol layer and a triacetyle cellulose layer;

preparing a liquid crystal substrate assembly which comprises a first glass substrate and a second glass substrate and a liquid crystal material disposed between said first glass substrate and said second glass substrate;

heating said at least one polarizer film at a first predetermined temperature for a first predetermined time in a first heat treatment process; and sticking said at least one polarizer films on at least one of said first and second glass substrates, after performing said first heat treatment process.

2. A method as set forth in claim 1, further comprising:

after sticking said at least one polarizer film on at least one of said first and second glass substrates, heating said liquid crystal substrate assembly in which said at least one polarizer film are stuck on at least one of said first and second substrates, at a second predetermined temperature for a second predetermined time in a second heat treatment process.

3. A method as set forth in claim 2, wherein the accuracy of flatness of said first and second glass substrates after said second heat treatment process is controlled to become equal to or higher than a predetermined value.

4. A method as set forth in claim 3, wherein the rate of moisture reduction of said at least one polarizer films in said first heat treatment process is controlled to become equal to or larger than a predetermined value which depends on the size of said at least one polarizer film, thereby the accuracy of flatness of said first and second glass substrates after said second heat treatment process is controlled to become equal to or higher than a predetermined value.

5. A method as set forth in claim 2, wherein the rate of warp of said first and second glass substrates after performing said second heat treatment process is controlled to become equal to or smaller than a predetermined value.

6. A method as set forth in claim 5, wherein the rate of moisture reduction of said at least one polarizer films in said first heat treatment process is controlled to become equal to or larger than a predetermined value which depends on the size of said at least one polarizer film, thereby the rate of warp of said first and second glass substrates after said second heat treatment process is controlled to become equal to or smaller than a predetermined value.

7. A method as set forth in claim 2, wherein the difference between a gap between said first and second glass substrates at a central portion of said liquid crystal display panel and a gap between said first and second glass substrates at an outermost portion of said liquid crystal display panel after performing said second heat treatment process is controlled to become substantially equal to or smaller than 0.2 $\mu$m.

8. A method as set forth in claim 7, wherein the rate of moisture reduction of said at least one polarizer films in said first heat treatment process is controlled to become equal to or larger than a predetermined value which depends on the size of said at least one polarizer film, thereby the difference between a gap between said first and second glass substrates at a central portion of said liquid crystal display panel and a gap between said first and second glass substrates at an outermost portion of said liquid crystal display panel after said second heat treatment process is controlled to become substantially equal to or smaller than 0.2 $\mu$m.

9. The method of claim 2, wherein said second predetermined temperature is no more than 100° C. and said second predetermined time is longer than approximately 2 minutes.

10. The method of claim 9, wherein said second predetermined time is longer than approximately 10 minutes.

11. A method as set forth in claim 1, wherein the rate of moisture reduction of said at least one polarizer films in said first heat treatment process is controlled to become equal to or larger than a predetermined value.

12. A method as set forth in claim 11, wherein the rate of moisture reduction of said at least one polarizer films in said first heat treatment process is controlled to become equal to or larger than a predetermined value which depends on the size of said at least one polarizer film.

13. A method as set forth in claim 12, wherein the rate of moisture reduction of said at least one polarizer films in said first heat treatment process is controlled to become equal to or larger than a predetermined value which depends on the size of said at least one polarizer film, by controlling the heating temperature and/or the heating time of said first heat treatment process.

14. A method as set forth in claim 1, wherein said at least one polarizer films comprise a first polarizer film and a second polarizer film; and wherein, in said sticking said at least one polarizer films on at least one of said first and second glass substrates after said first heat treatment process, said first polarizer film is stuck on said first glass substrate and said second polarizer film is stuck on said second glass substrate.

15. The method of claim 1, wherein said first predetermined temperature lies in a range of approximately 40° C. to approximately 80° C. and said first predetermined time is less than 25 hours.

16. A method of manufacturing a liquid crystal display panel comprising at least one polarizer film mounted on a glass substrate, said method comprising:

preparing at least one polarizer film, each said film having at least a polyvinyl alcohol layer, a triacetyle cellulose layer, an adhesive layer, and a separator;

heating said at least one polarizer film at a first predetermined temperature for a first predetermined time; and after said heating, removing said separator and adhering said polarizing film to a glass substrate using said adhesive layer.

17. The method of claim 16, further comprising:

after said adhering said polarizing film to said glass substrate, heating said liquid crystal panel at a second predetermined temperature for a second predetermined time.

* * * * *